Dec. 25, 1962    G. SMITH ET AL    3,070,742
MEASURING SYSTEM
Filed Oct. 15, 1957

INVENTORS
Graydon Smith
John E. Bailey
BY
Curtis Morris + Safford
ATTORNEYS

//  # United States Patent Office 3,070,742
Patented Dec. 25, 1962

3,070,742
MEASURING SYSTEM
Graydon Smith, Concord, and John E. Bailey, Needham, Mass., assignors, by mesne assignments, to Clevite Corporation
Filed Oct. 15, 1957, Ser. No. 690,285
3 Claims. (Cl. 323—60)

This invention is in the field of electrical measuring systems and relates particularly to position-responsive devices for producing an electrical signal the value of which is a measure of the displacement of a movable element from a predetermined position. This application is a continuation-in-part application based on copending application Serial No. 319,064, filed on November 6, 1952, by the present applicants, now abandoned.

In many instances, the value of an unknown condition can be measured by arranging for the condition to control the physical displacement of a movable element and measuring the extent of the displacement. For example, it is often convenient to measure pressure, strain, roughness, etc. by measuring the amount of movement or the position of such a controlled element. In gauging, a feeler is commonly used and its displacement from a predetermined position is a direct measure of the deviation of the test piece from a predetermined dimension.

Because electrical signals can be magnified electronically, it is advantageous in many instances to translate the position or displacement of the movable element into an electrical signal which, after amplification, can be used to operate an indicator, recorder, control system, or the like.

A large variety of such devices for translating physical displacements into electrical signals have been heretofore proposed. One particular type that has a number of important advantages is an inductive device, such as shown in U.S. Patent 2,207,248, which comprises a pair of magnetic circuits having a common air-gap within which is mounted a movable "flux-barrier" arranged to control the relative magnitudes of flux produced in the two magnetic circuits by an A.-C. energized primary winding. Secondary windings are provided on the two magnetic circuits respectively and are connected in series-opposition so that, when the flux-barrier is positioned to evenly divide the flux between the two circuits, the output voltage will be zero. As the flux-barrier moves away from this "null" position, the output of one secondary winding will increase while the output of the other secondary winding will decrease. Consequently, there will be produced a net output voltage having a magnitude substantially linearly proportional to the extent of flux-barrier movement and having a phase determined by the direction of this motion away from the "null" position.

Frequently it is desired to provide such a position-measuring device wherein the output voltage is exactly 180° out of phase with respect to the energizing signal fed to the primary winding. For example, such a device often may advantageously be used with a phase-sensed amplitude detector wherein the output signal from the secondary windings is combined with an A.-C. comparison signal to produce a D.-C. signal having a magnitude and polarity corresponding to the amplitude and phase of the secondary output signal. By providing the inductive device with means to produce 180° phase difference between its input and its output, the comparison signal for the phase-sensed detector can be obtained directly from the same A.-C. source that is used to energize the primary winding of the inductive position-measuring device. This is an advantage particularly because it eliminates the need for complex and expensive phase-shifting networks, etc., that often are unsatisfactory at best.

It also often is desirable to operate the position-measuring device under varying ambient temperature conditions, and consequently it is important to provide means for assuring that the required 180° phase difference will be maintained under such conditions. The means for providing this phase control must, of course, be simple and inexpensive to manufacture.

Another important factor involved is that the amount of phase-difference between the energizing and output signals is affected by the frequency of the A.-C. energizing source, and phase-controlling means that are suitable for one range of frequencies may not be operable in another range of frequencies. In particular, it has been found that one form of phase-controlling means advantageously may be used with certain inductive devices of this type that are energized by a source the frequency of which is, say, several hundred cycles per second, whereas for such inductive devices energized at a relatively lower frequency, e.g. 60 c.p.s., another form of phase-controlling means should be used.

Furthermore, it is especially desirable in certain applications to provide a positioning-measuring device the movable input member of which transmits effectively no reactive force back to the primary element the position of which is being measured. It has been found that this characteristic can be obtained with inductive devices of the type referred to above in a simple and economical manner.

Accordingly, it is an object of this invention to provide an inductive position measuring device of the type described which includes means for establishing a 180° phase differential between the energizing signal and the output signal. It is a further object of this invention to provide such a device including means to assure that the required phase differential can be maintained under conditions of varying ambient temperatures. It is a still further object of this invention to provide such a device arranged to develop essentially zero reaction force. Other objects, aspects and advantages of the invention will in part be pointed out in, and in part apparent from, the following description considered together with the accompanying drawing, in which:

Figure 1:
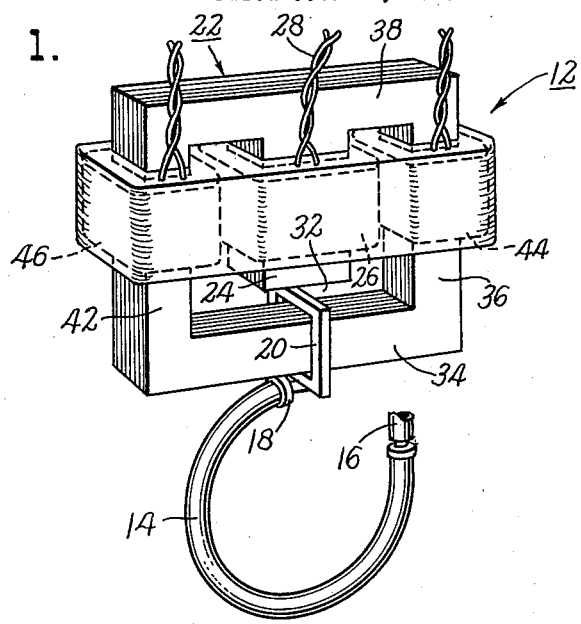
FIGURE 1 is a perspective view of a position-responsive device adapted for measuring the deflection of a Bourdon tube.

As shown in FIGURE 1, a position-responsive device, generally indicated at 12, is arranged to measure pressure by means of a Bourdon tube 14. When the internal pressure of the Bordon tube is varied, as by changing the pressure applied to it through a fitting 16, the free end 18 of the tube is caused to move in accordance with the pressure variations, as is well known in the art. Attached to the free end 18 of the Bourdon tube 14 is a conductive ring or "flux-barrier" 20, which moves with the end 18 and controls the distribution of magnetic flux within the position-responsive device 12 so as to cause changes in the electrical output from the device, as explained hereinafter.

The position-responsive device 12 includes a three-legged magnetic core 22 formed of ferromagnetic material, such as laminated transformer iron. Surrounding the center leg 24 of the core 22 is a primary winding 26 connected by leads 28 to a source of alternating voltage, not shown. The alternating flux induced in the center leg 24 by the current flowing in the primary winding 26 can flow in either or both of two paths. One path extends from the leg 25 across an air gap 32 into the base portion 34 of the core and thence through the right-hand leg 36 and through the top portion 38 of the core back to the center leg 24. The other path extends from the center leg 24 across the air gap 32 through the base portion 34, through the left-hand leg 42, and through the top core portion 38 to the center leg 24. The common portions of these two paths include the center leg 24 and the air gap 32.

In order to measure the magnetic flux condition within the right-hand leg 36 a secondary winding 44 is placed therearound and a voltage is induced in it by the flux in the right-hand leg 36. Surrounding the left-hand leg 42 is another identical secondary winding 46 in which a voltage is induced corresponding to the flux flowing through the leg 42. The relative distribution of the flux between the right and left-hand legs 36 and 42 can be determined by the voltages appearing across the outputs of the secondary windings 44 and 46, respectively.

The "flux-barrier" 20, which moves within the air gap 32, is a non-magnetic electrically conducting member which resists any change in the magnetic flux linking it or passing through it. In this example, the flux-barrier 20 comprises a single shorted turn of conductive non-magnetic material, such as copper, aluminum, or the like, and encloses, and is spaced from, the base portion 34 of the core 22. Because this shorted turn tends to prevent any change in the flux linkages through it, it acts to prevent the flow of any appreciable amount of alternating flux through the base 34 at the position of the flux-barrier. Accordingly, movement of the flux-barrier 20 to the right or left along the base portion 34 is utilized to control the relative division of flux between the right and left-hand legs 36 and 42 respectively.

If the flux-barrier 20 is positioned at the horizontal center of the air gap 32, that is, midway between the right-hand and left-hand edges of the gap as shown in FIGURE 1, the flux produced by the primary winding 26 will be divided equally between the right and left-hand legs 36 and 42, respectively.

If the flux-barrier 20 is displaced laterally in either direction from this center or zero position, the relative division of flux in the two legs 36 and 42 will be changed. For example, assume that the pressure in the Bourdon tube 14 changes so as to cause the flux-barrier 20 to move along the base 34 toward the right-hand leg 36, so as to reduce the area of the air gap 32 on the right of the flux-barrier 20 and to increase the area of the air gap on the left of the flux-barrier 20. The flux will pass into the base 34, but will be prevented from extending toward the right through the base 34 because of the presence of the flux-barrier 20, and so these flux lines will extend through the left-hand leg 42. Those flux lines extending across the air gap to the right of the flux-barrier 20 will be confined to the right-hand leg 36. With the flux-barrier 20 in this position, a greater portion of the flux induced in the core 22 by the primary winding 26 will flow through the left-hand leg 42, and accordingly, the voltage output from the secondary winding 46 will be relatively increased while that from the secondary winding 44 will be relatively decreased. These output voltages from the secondary windings 44 and 46 are measured in order to determine the position of the barrier 20 and hence the pressure in the tube 14.

Figure 2:
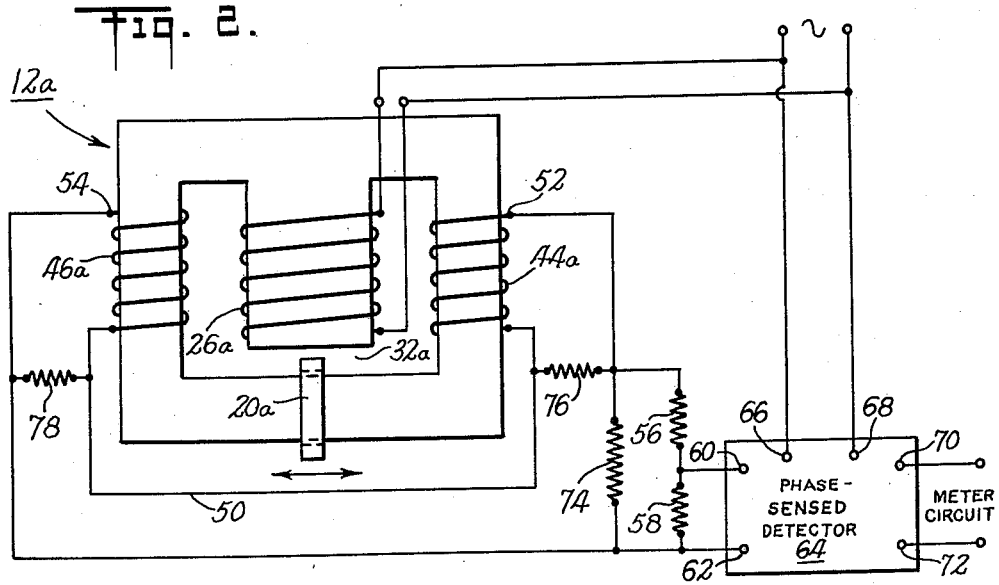
FIGURE 2 shows diagrammatically a position-responsive device similar to that shown in FIGURE 1 provided with phase-control resistors in the secondary winding circuit, with the secondary windings being coupled to a phase-sensed amplitude detector.

FIGURE 2 shows diagrammatically the device of FIGURE 1 including circuit means to establish and maintain a phase-differential of 180 degrees between the energizing and output signals. In this arrangement, the secondary windings 44a and 46a are connected in series-opposition by a lead 50, and the secondary winding output terminals 52 and 54 are connected to the remote ends of an amplitude-compensating network including a resistor 56 in series with a resistor 58. The first of these resistors is formed of material having a zero temperature coefficient of resistance, while the other is formed of material having a positive temperature coefficient of resistance, so that the amplitude of the signal across the resistor 58 is maintained constant with changes in ambient temperature.

The output signal produced across the resistor 58 is fed to the input terminals 60 and 62 of a phase-sensed amplitude detector indicated in block form at 64. This detector may be of any conventional form well known in the art, and its energizing terminals 66 and 68 are supplied with an A.-C. comparison signal by the source which also energizes the primary winding 26a. This comparison signal is combined within the detector with the A.-C. input signal from the inductive device 12a to produce a D.-C. signal at the output terminals 70 and 72 having a magnitude and polarity corresponding to the amplitude and phase respectively of the A.-C. output signal fed thereto. That is, when the flux-barrier 20a is in its "null" position, the D.-C. signal will be zero, whereas movement of the flux-barrier in either direction from this position will produce a D.-C. signal of positive or negative polarity respectively. The D.-C. signal from the detector 64 is fed to a load which may comprise a meter or may include further elements of a recording and control system.

To obtain proper operation of the phase-sensed detector 64, it is necessary that the A.-C. output signal fed to terminals 60 and 62 be either exactly in phase, or 180° out of phase, with respect to the comparison signal fed to the terminals 66 and 68. In order to accomplish this, the inductive device 12a must be arranged in such a manner that the output signal produced by the secondary windings 44a and 46a is exactly in phase, or 180° out of phase, with respect to the energizing signal fed to the primary winding 26a. Ordinarily, in an inductive device of this type operated at a moderately high energizing frequency of, say, several hundred c.p.s., the A.-C. output voltage will lead the energizing signal. Consequently, corrective means must be provided.

Applicants have discovered that this problem can be solved in a very simple manner by connecting a resistor 74 of predetermined ohmic resistance across the secondary winding terminals 52 and 54. Although the precise theoretical explanation undoubtedly is quite complex even though based on simplifying assumptions, it has been found as a practical matter that the phase angle of the output signal can be controlled by altering the magnitude of this resistance; a resistor that has too great an ohmic resistance will not shift the phase angle sufficiently to achieve a 180° phase-differential, while a resistance that is too small will produce a lagging phase angle between the output and energizing signals.

Desirably, the magnitude of the resistor 74 is quite large (e.g. about 2000 ohms) so as to minimize power losses and maintain the reflected primary current small. To this end, the inductive device 12a should be arranged in such a way that its open-circuit secondary output signal leads the energizing voltage by only several degrees, e.g. no more than about 5 degrees. Furthermore, the impedance of the load (e.g. the phase-sensed detector and the meter circuit) preferably is considerably higher than the resistance of the resistor 74 in combination with the resistors 56 and 58; and this latter resistance desirably is much higher than the output impedance of the inductive device 12a (normally about 50 ohms). Advantageously the net load impedance is at least ten times greater than the shunt resistance of the corrective resistors and this latter resistance should be at least ten times greater than the output impedance of the inductive device 12a.

Since the inductive device 12a frequently will be used in places where the ambient temperature fluctuates over a wide range, it also is especially desirable to provide means for assuring that the required phase differential between the energizing and output signals will be maintained constant under such varying conditions. Applicants have found that this can be accomplished by employing as the resistive element 74 a temperature-sensitive resistor the ohmic resistance of which decreases as the temperature increases. By selecting a resistor having a negative tempearture coefficient of resistance matched to the characteristics of the particular inductive device involved, the phase angle of the secondary winding output voltage will be maintained essentially precisely 180° out of phase with respect to the energizing signal fed to the primary winding 26a, under all ordinary atmospheric temperature variations. The resistor 74 should have a sufficiently large negative temperature coefficient to more than counteract the change in shunt resistance due to the positive temperature coefficient of the resistor 58, thus producing a net reduction in shunt resistance with an increase in temperature.

The secondary windings 44a and 46a also are provided with individual shunt phase-trimming resistors 76 and 78, e.g. having resistances in the range of about 10,000 to 30,000 ohms. The exact values of these resistors are preselected to produce exact phase alignment between the voltages produced separately by the two secondary windings so as to assure a sharp "null" point when the voltages are of equal amplitude.

When an inductive device of the type described above is energized at a relatively low frequency, e.g. about 60 c.p.s., the open-circuit secondary output signal frequently will, with practical magnetic core constructions, lead the energizing signal by a substantial phase angle. To correct such a large phase angle by means of a shunt resistor 74, as in FIGURE 2, it may be necessary to use a resistor of such low ohmic resistance that the inductive device 12a becomes overloaded. That is, the magnitude of the secondary output voltage may become too small for practical purposes, and the reflected primary winding current may become so large as to introduce excessive output signal variations due to changes in the primary winding resistance with changes in ambient temperature.

Figure 3:
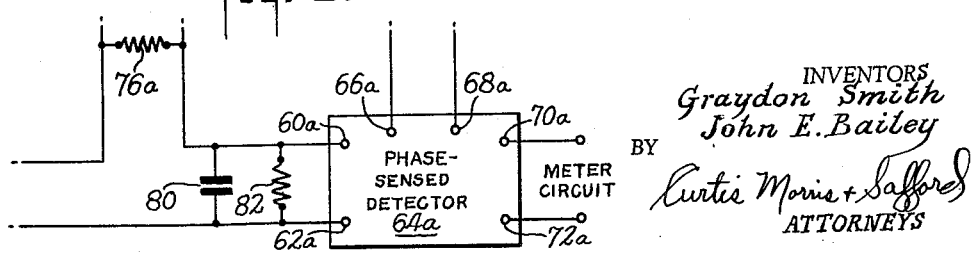
FIGURE 3 shows a modification to the device of FIGURE 2.

This problem may readily be solved by the arrangement shown in FIGURE 3, which shows in fragmentary form a modification to the output circuit of the FIGURE 2 construction. In this modification, the amplitude-compensating resistors 56, 58 have been eliminated, merely to simplify the disclosure in FIGURE 3, and the shunt resistor 74 has been replaced by a capacitor 80. It has been found that this shunt capacitor serves to shift the normal large leading phase angle (which occurs when the secondary windings 44a and 46a are open-circuited, i.e. under no-load conditions) towards a lagging phase angle. By selecting the proper value of shunt capacitance, the output signal phase will be shifted sufficiently that this signal is precisely 180° out of phase (or in phase) with respect to the energizing signal. Furthermore, apparently because the capacitor 80 represents reactive rather than resistive impedance, the inductive device 12a (FIGURE 2) is not overloaded by such a corrective element, i.e. the magnitude of the output signal is not effectively diminished and the primary winding current is not substantially increased.

It also has been found that a further improvement can be obtained by connecting an additional resistor 82 in parallel with the capacitor 80. By properly selecting the values of this resistor and capacitor, the reaction force produced by the flux-barrier 20a against the driving element (e.g. the Bourdon tube 14 in FIGURE 1) can be reduced effectively to zero, and the desired 180° phase-differential still can be maintained as in the case of the purely capacitive element. Such a combination of capacitance and resistance not only shifts the output signal phase the required amount, but also apparently shifts the phase of the current circulating in the flux-barrier to such an extent that this current is 90° out of phase with respect to the flux passing across the air-gap 32a, and hence this flux does not produce any net force on the flux-barrier. As a result, the inductive device is well adapted for use in applications where very low driving forces are available, and where precision measurements are required.

Additionally, the resistor 82 advantageously is formed of material having a negative temperature coefficient of resistance so that the desired phase relationships will be maintained under conditions of varying ambient temperature.

Although several preferred embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. Position measuring apparatus comprising, in combination, a magnetic core structure arranged to form first and second magnetic circuits having a common core portion through which said magnetic circuits pass, air-gap means in series with both of said magnetic circuits, primary winding means for inducing alternating flux in both of said magnetic circuits, a primary winding electrical circuit connected to said primary winding means and adapted to be coupled to a source of alternating current of predetermined fixed frequency, a movably-mounted flux-barrier of non-magnetic electrically-conductive material positioned to extend into said air-gap means and arranged to vary the relative division of flux between said first and second magnetic circuits in accordance with the lineal displacement of said flux-barrier from a predetermined position, a source of motion operably connected to said flux-barrier to vary the positioning thereof in said air-gap means in accordance with changes in a condition being measured, secondary winding means on said core structure for producing an electrical output signal which changes in magnitude in accordance with variations in the positioning of said flux-barrier, output circuit means adapted to connect the output signal produced by said secondary winding means to a phase-responsive device, and a phase-correcting resistor connected directly in shunt across said secondary winding means, said resistor having a pre-selected ohmic resistance just sufficient to shift the phase of said output signal an amount required to provide a phase differential of precisely 180 degrees between said output signal and the energizing signal produced by said source of alternating current.

2. Position measuring apparatus comprising, in combination, a magnetic core structure arranged to form first and second magnetic circuits having a common core portion through which said magnetic circuits pass, an air-gap in series with both of said magnetic circuits, primary winding means for inducing alternating flux in said magnetic circuits, a primary winding electrical circuit connected to said primary winding means and adapted to be coupled to a source of alternating current of predetermined fixed frequency, a movably-mounted flux-barrier of non-magnetic electrically-conductive material positioned to extend into said air-gap means and arranged to vary the relative division of flux between said first and second magnetic circuits in accordance with the lineal displacement of said flux-barrier from a predetermined position, a source of motion operably connected to said flux-barrier to vary the positioning thereof in said air-gap means in accordance with changes in a condition being measured, first and second secondary windings coupled to said first and second magnetic circuits respectively for producing an electrical output signal which changes in magnitude in accordance with variations in the positioning of said flux-barrier, output circuit means for connecting said secondary windings together in series-opposition and to a load, and a resistor connected in shunt across one of said secondary windings, said resistor having an ohmic resistance just sufficient to shift the phase of the output signal produced by said one winding an amount required to provide exact phase alignment between the output signals produced separately by said secondary windings.

3. Position measuring apparatus comprising, in combination, a magnetic core structure arranged to form first and second magnetic circuits having a common core portion through which said magnetic circuits pass, air-gap means in series with both of said magnetic circuits, primary winding means for inducing alternating flux in both of said magnetic circuits, a primary winding electrical circuit connected to said primary winding means and adapted to be coupled to a source of alternating current of predetermined fixed frequency, a movably-mounted flux-barrier of non-magnetic electrically-conductive material positioned to extend into said air-gap means and arranged to vary the relative division of flux between said first and second magnetic circuits in accordance with the lineal displacement of said flux-barrier from a predetermined position, a source of motion operably connected to said flux-barrier to vary the positioning thereof in said air-gap means in accordance with changes in a condition being measured, secondary winding means on said core structure for producing an electrical output signal which changes in magnitude in accordance with variations in the positioning of said flux-barrier, output circuit means adapted to connect the output signal produced by said secondary winding means to a load, and impedance means connected across said secondary winding means, said impedance means having a value just sufficient to shift the phase of the current circulating in said flux-barrier to such an extent that said circulating current is 90° out of phase with respect to the flux crossing said air-gap means, so that the reaction force on said flux-barrier is reduced effectively to zero.

References Cited in the file of this patent

UNITED STATES PATENTS

| | | |
|---|---|---|
| 1,936,801 | Nycum | Nov. 28, 1933 |
| 1,950,676 | Higgins | Mar. 13, 1934 |
| 2,207,248 | Garlick | July 9, 1940 |
| 2,338,080 | Brown | Dec. 28, 1943 |
| 2,411,423 | Guptill | Nov. 19, 1944 |
| 2,418,553 | Irwin | Apr. 8, 1947 |
| 2,470,099 | Hall | May 17, 1949 |
| 2,491,736 | Irwin | Dec. 20, 1949 |
| 2,631,272 | Smith | Mar. 10, 1953 |
| 2,637,353 | Wiancko | Oct. 27, 1953 |
| 2,857,564 | Gray | Oct. 21, 1958 |
| 2,885,660 | Hecox et al. | May 5, 1959 |

FOREIGN PATENTS

| | | |
|---|---|---|
| 433,360 | Great Britain | Aug. 13, 1935 |